United States Patent [19]

Wotawa et al.

[11] Patent Number: 4,765,085
[45] Date of Patent: * Aug. 23, 1988

[54] FISHING LURE

[76] Inventors: Fred W. Wotawa, 4646 Heege Rd., Affton, Mo. 63123; Patrick J. Wotawa, 650 Forder, St. Louis, Mo. 63129

[*] Notice: The portion of the term of this patent subsequent to Oct. 28, 2003 has been disclaimed.

[21] Appl. No.: 923,325

[22] Filed: Oct. 27, 1986

Related U.S. Application Data

[63] Continuation-in-part of Ser. No. 637,075, Aug. 2, 1984, Pat. No. 4,619,068.

[51] Int. Cl.⁴ ............................................ A01K 85/00
[52] U.S. Cl. .................................... 43/42.11; 43/42.13
[58] Field of Search ................ 43/42.11, 42.13, 42.14, 43/42.16, 42.17, 42.18, 42.47

[56] References Cited

U.S. PATENT DOCUMENTS 1,585,943  5/1926  Streich .
1,787,726  1/1931  Heddon et al. .
2,714,273  8/1955  Torrance .......................... 43/42.18
2,805,512  9/1957  Bunce ............................... 43/42.18
2,817,921 12/1957  Czesnocha ..................... 43/42.18
2,957,265 10/1960  Hunt ................................. 43/42.47
3,143,824  8/1964  Thomas ........................... 43/42.11
3,546,804 12/1970  Woolums ........................ 43/42.11
3,808,726  5/1974  Flanagan, Jr. .................. 43/42.13
4,003,154  1/1977  Carver ............................. 43/42.13
4,209,932  7/1980  Pate ................................. 43/42.11
4,432,157  2/1984  Gowing ........................... 43/42.31
4,619,068 10/1986  Wotawa .......................... 43/42.11

FOREIGN PATENT DOCUMENTS 3202035  9/1976  France ............................. 43/42.16

Primary Examiner—Gene P. Crosby
Attorney, Agent, or Firm—Senniger, Powers, Leavitt and Roedel

[57] ABSTRACT

A fishing lure has a vane adapted for oscillating movement but not adapted for rotational movement. A spinner is connected to the trailing end of the vane and a hook is operatively connected to the leading end of the vane. An eye arrangement is provided for attaching the lure to the fishing line.

16 Claims, 2 Drawing Sheets

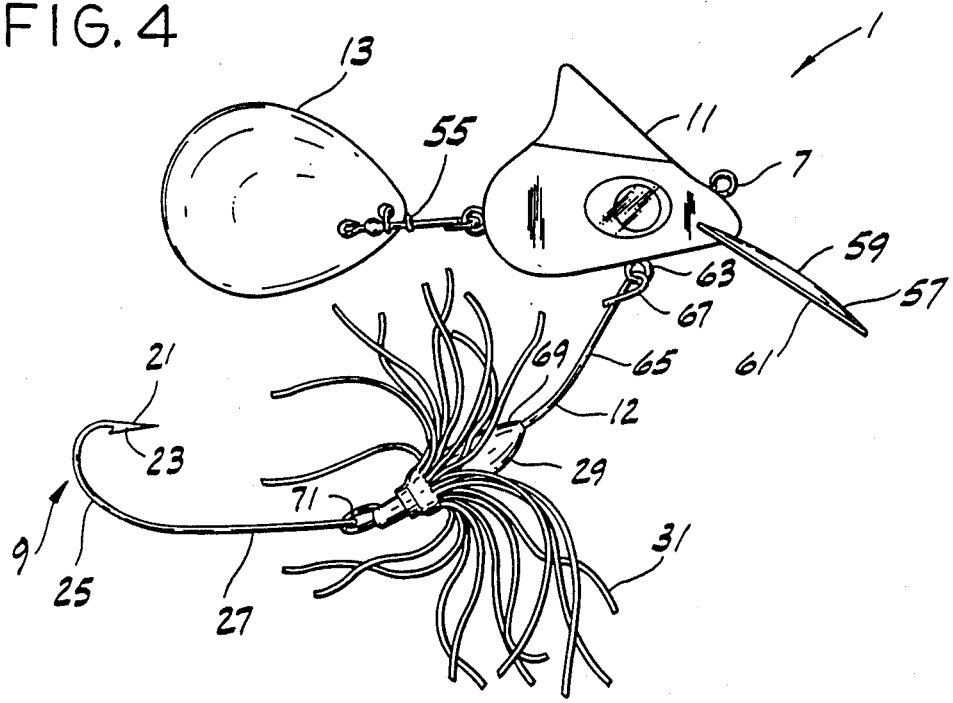
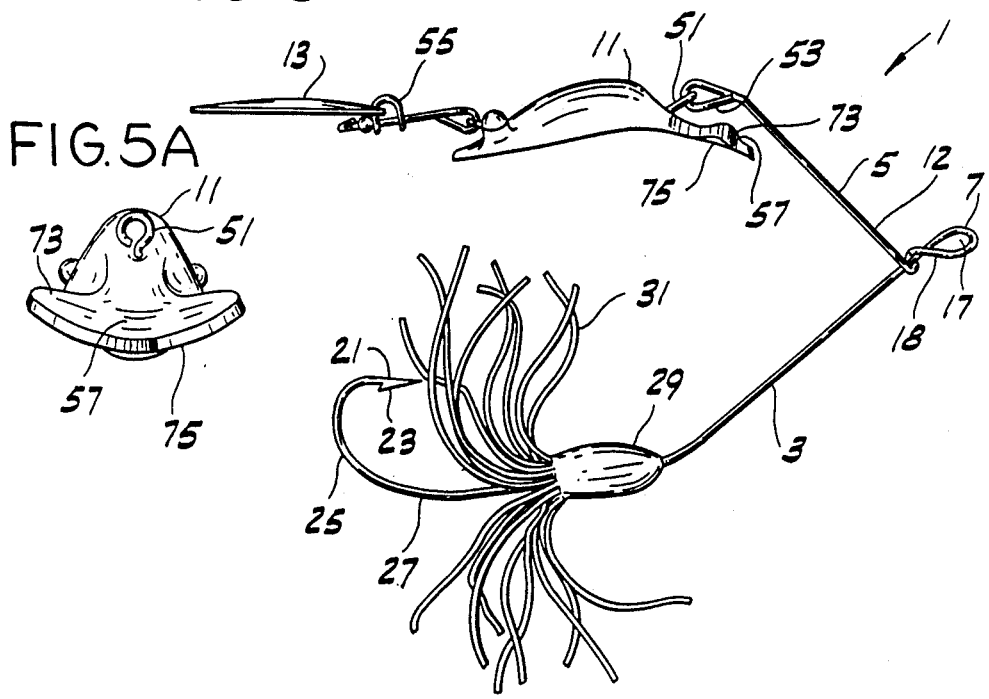

FISHING LURE

CROSS-REFERENCE TO RELATED APPLICATION

This application is a continuation-in-part of copending application Ser. No. 637,075, filed Aug. 2, 1984, now Pat. No. 4,619,068.

BACKGROUND OF THE INVENTION

This invention relates generally to fishing lures of the spinner bait type which include a body and hook portion and a spinner blade for attracting fish.

It is known that fish are attracted by vibrations and other movements and that the more closely the movement of an artificial bait, such as a lure, imitates the natural movement of real bait, the more likely a fish will strike at the lure.

Spinners have long been used to enhance the effectiveness of lures. See, for instance, the spinner baits generally disclosed in U.S. Pat. Nos. 3,143,824 and 4,209,932 which contain rotatable spinner elements. Spinners create a flash and a vibration which is believed to imitate the vibrations and light reflections created by the body of small swimming fish. Because of their rotational movement, however, spinners do not imitate the swimming motion of a fish as well as would be desired.

It is also well known that game fish may be located at various depths depending upon the prevailing conditions. To maximize the catch, a fisherman will attempt to maintain the lure at a particular depth for as great a distance as possible for each cast. Presently available spinner baits, however, follow the line as the lure is brought in, the lure generally moving through the water along an upwardly sloped path toward the raised tip of the rod. Thus, while the fisherman may prefer to fish the lure at a particular depth for given conditions, the lure passes through the preferred region only during a portion of its path when retrieved. Although the depth of these lures may be affected by the rate of return, i.e., the slower the return, the deeper the lure will run, or by the manner of return, i.e., a stop and go return will permit the lure to sink for short periods during the return, these techniques are not always convenient. For instance, it may be desirable to fish at the bottom of a relatively deep body of water but at a constant and rapid rate of return. It would be a great improvement, therefore, to provide a spinner bait which will maintain a desired depth as it is returned, even if returned at a rather rapid rate.

SUMMARY OF THE INVENTION

Among the several objects of the invention may be noted the provision of a fishing lure which closely imitates the swimming motion of a small fish; the provision of a lure which may be fished at a desired depth and yet retrieved at a relatively rapid rate; and the provision of such a fishing lure which is of simple and economical construction.

Briefly, therefore, a fishing lure of this invention comprises a vane adapted for oscillating movement but not full rotational movement as the lure travels through the water, a spinner rotatably fastened to the vane, a hook, means connecting the hook to the vane and means for attaching the lure to the fishing line.

Another aspect of the present invention is directed to a fishing lure comprising a vane adapted for oscillating movement but not full rotational movement as the lure travels through the water, a spinner rotatably fastened to the vane, a hook, means connecting the hook to the vane, means for maintaining the depth of the lure as it travels through the water and means for attaching the lure to the fishing line.

A further aspect of the present invention is directed to a fishing lure comprising first and second diverging arms, means adjacent the juncture of said arms for attaching the lure to a fishing line, a hook connected to the first arm, a vane connected to the second arm, the vane adapted for oscillating movement but not full rotational movement as the lure travels through the water, a spinner and means rotatably fastening the spinner to vane.

Other objects and features will be in part apparent and in part pointed out hereinafter.

BRIEF DESCRIPTION OF THE DRAWINGS

FIG. 4 is a side plan of an alternative embodiment of this invention;

FIG. 5 is a side plan of another alternative embodiment of this invention; and

FIG. 5A is a front elevation of FIG. 5 with a portion of the lure removed for clarity.

Corresponding reference characters indicate corresponding parts throught the several views of the drawings.

DESCRIPTION OF THE PREFERRED EMBODIMENT

Figure 1:
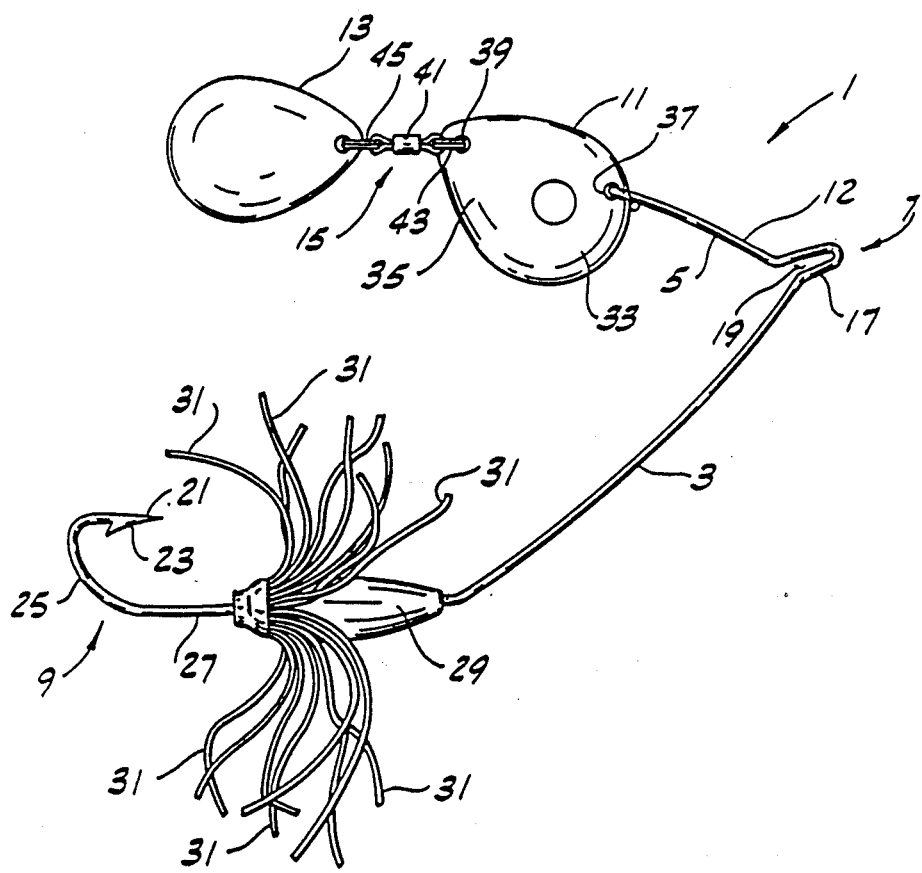
FIG. 1 is a side elevation of a fishing lure of this invention.

Referring now to the drawings, FIG. 1 depicts a fishing lure 1 of this invention as comprising first and second diverging arms, 3 and 5 respectively, and means 7 adjacent the juncture of the arms for attaching the lure to the fishing line (not shown). A hook 9 is connected to the first arm 3, lower arm as viewed in FIG. 1, and a vane 11 is connected to the second arm 5, upper arm as viewed in FIG. 1.

More particularly, the arms 3, 5 are formed from a single strand of relatively resilient wire and are disposed in a generally coplanar relationship. The arms are joined by attaching means 7 comprising an eye 17 with a rearward (the left end as viewed in FIG. 1) peripheral opening 19. A fishing line or the like is secured to the eye 17 in any conventional manner.

The hook 9 of the lure has a point 21, barb 23, bend 25 and a shank 27. A weighted body 29 is molded around the shank and made from lead or the like. A plurality of long strands 31 are suitably secured to one end of the body (the left end as viewed in FIG. 1) and are used to conceal the hook and barb as will be described later to provide more attraction for fish during the use of the lure.

As viewed in FIG. 1, the combination of the first and second diverging arms, 3 and 5 respectively, means 7 adjacent the juncture of the arms for attaching the lure to the fishing line and the weighted body 29 constitute means 12 connecting the hook 9 to the vane 11.

Figure 2:
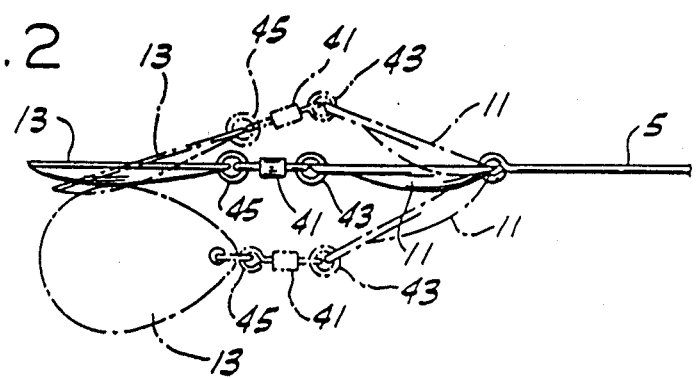
FIG. 2 is a top plan of FIG. 1 with the lower portion of the lure removed for clarity and movement of the top portion of the lure shown in phantom.

Also as depicted in FIG. 1, the vane 11 of the lure is connected to the free end of the second arm 5 and, as shown in FIG. 2, is generally pear shaped with a relatively broad front portion 33 and a narrower rear portion 35. However, it will be understood that the vane can be of any shape, e.g., triangular, rectangular, or it may be formed in the likeness of a fish, crayfish or other natural bait for gamefish. The front portion of the vane has a hole 37 therein for attaching the vane to the free end of the second arm. This attachment is accomplished by simply passing the free end of the second arm through the hole 37 and bending it back, thereby forming a hook. Loosely connecting the vane to the second arm in this manner permits the vane to oscillate laterally, i.e., move from side to side, relative to the second arm as the lure is retrieved through the water. In addition, attaching the vane to the second arm in this manner restricts the vane from full rotation about a central axis.

Also as depicted in FIG. 1, the vane 11 has a second hole 39 in the rear portion thereof for attachment of a swivel 41 thereto. The swivel is rotatably attached to the vane by means of a first split ring 43 as shown in the drawings. A second split ring 45 is used to attach the spinner 13 to the swivel 41.

As the lure depicted in FIG. 1 is being trolled or retrieved (from left to right as shown), it will be generally disposed as viewed in FIG. 1 due to the weight of the body 29. The ends of the strands 31 will conceal the hook 9 due to the movement of the lure through the water as will be understood by those familiar in the art. Significantly, the spinner rotates as the lure is retrieved and this spinning action imparts a unique vibrating movement to the vane. The action of the spinner causes the vane to rapidly oscillate from side to side, the side to side movement including a horizontal component as shown in FIG. 2, and a restricted rotational component, i.e., a rolling from side to side (not shown). Because of the manner in which the vane is attached to the arm 5, however, the vane is restricted from full (i.e., 360°) rotation about a central axis. It is believed that the vane and the spinner impart an action to the lure unlike that of any previous spinner bait and which more closely imitates the swimming motion of a small fish.

Figure 3:
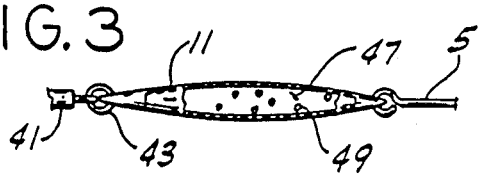
FIG. 3 is an enlarged top view illustrating a second embodiment of the vane of the invention with parts broken away to show details.

In an alternative embodiment, FIG. 3 shows a torpedo shaped vane, i.e., a vane having convex sides and an inner cavity 47 with a plurality of pellets or BB's 49 therein. The number and size of the pellets are such that they can freely move within the cavity of the vane.

In a further alternative embodiment, FIG. 4 shows a vane 11 in the likeness of a fish, having means 7 for attaching the lure to the fishing line (not shown), the means 7 consisting of a closed loop. The vane 11 is rotatably connected to a spinner 13 by means of a clevis 55. Near the front portion of the vane 11 (the right side as viewed in FIG. 4) are means 57 in the form of a lip adapted for maintaining the lure at a relatively constant depth as the lure is retrieved. In this instance, the lip 57 consists of a relatively long and narrow piece of metal firmly attached to the vane; as shown in FIG. 4, length being measured in the direction from left to right and width being measured into the page. Also, the lip 57 is downward sloping, i.e., it slopes downward as viewed from left to right in FIG. 4 and has a convex upper surface 59 and a concave lower surface 61.

The lip 57, generally, may be any surface upon which the water exerts a downward force as the lure is retrieved or trolled. Preferably, the lip is affixed to or forms part of the vane. In addition, it is preferred that the lip extend forwardly from the lure, i.e., extend from the lure in the direction that it is retrieved or trolled, from left to right as depicted in FIG. 4. Where the lip extends forwardly from the lure, it is also preferred that it extend downwardly in the forward direction. The lip may be formed from a piece of metal or plastic which is rather narrow in width but relatively long in the forward direction as depicted in FIG. 4 or may alternatively be formed from a piece of metal or plastic that is relatively wide but relatively short in the forward direction. Those skilled in the art will appreciate those combinations of length, width and orientation of the lip that may be used so that it has sufficient surface area upon which the water can exert an effective downward force.

As further depicted in FIG. 4, the vane 11 is connected to the hook 9 by means 12. Means 12 comprises a closed loop 63 affixed to the bottom side of the vane 11, an arm 65 having its upper end 67 wrapped about the closed loop 63, a weighted body 29 molded around the lower end 69 of the arm 65 and a closed loop 71 attached to the weighted body 29 and threaded through the eye (not shown) of the hook 9. Attaching the hook 9 to the weighted body 29 in this manner allows the hook 6 to move freely about the closed loop 71, thereby reducing the risk of snags as the lure is retrieved.

As the lure depicted in FIG. 4 is being trolled or retrieved (from left to right as shown), it will be generally disposed as viewed in FIG. 4 due to the weight of the body 29. The ends of the strands 31 will conceal the hook 9 due to the movement of the lure through the water as will be understood by those familiar in the art. As the lure is retrieved, the spinner rotates and the vane oscillates rapidly from side to side, the side to side movement including a horizontal component and a restricted rotational component, i.e., a rolling from side to side. Significantly, however, the vane cannot rotate a full 360° relative to a fixed axis.

Furthermore, as the lure depicted in FIG. 4 is retrieved, the lip 57 is adapted such that the lure will tend to maintain a depth at even rapid rates of retrieval. The lure may thus be advantageously retrieved at a relatively rapid rate and at a substantially constant depth.

In a further embodiment of this invention, FIG. 5 depicts a vane 11 which is formed in the likeness of the body of a crayfish. The vane 11 has a closed loop 51 through which the vane 11 is connected to the arm 5 by inserting the upper end 53 of the arm 5 and bending the upper end 53 back to form a loop. As shown in FIG. 5 and FIG. 5A, the vane 11 also has a lip 57 which consists of a downward sloping (from left to right as depicted in FIG. 5) concave upper surface 73 and a downward sloping (from left to right as depicted in FIG. 5) convex lower surface 75. As described for the lure shown in FIG. 4, the lip 57 is adapted for maintaining the lure at a relatively constant depth as it is retrieved.

As further depicted in FIG. 5, the means 12 connecting the hook 9 to the vane 11 comprises first and second diverging arms, 3 and 5 respectively, the weighted body 29 and the means 7 adjacent the juncture of the arms for attaching the lure to the fishing line. In this instance, the attaching means 7 comprises an eye 17 formed by wrapping a single wire about itself to form a closed loop 18 and diverging arms, 3 and 5.

As the lure depicted in FIG. 5 is being trolled or retrieved (from left to right as shown), it will be generally disposed as viewed in FIG. 5 due to the weight of the body 29. The ends of the strands 31 will conceal the hook 9 due to the movement of the lure through the water as will be understood by those familiar in the art. The vane 11 will swing from side to side with the spinner rotating therebehind, all in a manner similar to that described for the lure shown in FIG. 1. Due to the downward force exerted on the lip 57 by the water as the lure is trolled or retrieved, the lure depicted in FIG. 5 will have a tendency to maintain a relatively constant depth if retrieved at a relatively constant rate.

While the lip 57 has been described as being adapted for maintaining the depth of the lure as it is retrieved, this is not to be considered in the limiting sense. For instance, it is considered that a lip which is designed to increase the depth of the lure, i.e., cause it to run deeper, as it is retrieved is included within the present invention.

Although the preferred embodiment of the present invention is described above, it is clear that other embodiments are possible, all within the scope of this invention. For instance, a hook may be attached to the spinner rotatably connected to the vane. Similarly, a hook may be attached to the lower side of the vane depicted in FIG. 1.

In view of the above, it will be seen that the several objects of the invention are achieved and other advantageous results are attained.

As various changes could be made in the above construction without departing from the scope of the invention, it is intended that all matter contained in the above description or shown in the accompanying drawings shall be interpreted as illustrative and not in a limiting sense.

What is claimed is:

1. A fishing lure comprising a vane adapted for oscillating movement but not full rotational movement, a spinner, means rotatably fastening the spinner to means connecting the hook to the vane at a the vane generally adjacent the rear of the vane, a hook, point forward of the spinner fastening means, said hook connecting means comprising an arm supporting a weighted body and the hook, the weighted body being adjacent the hook and means for attaching the lure to the fishing line.

2. A fishing lure as set forth in claim 1 wherein said connecting means comprises first and second diverging arms, the means for attaching the lure to the fishing line being adjacent the juncture of said arms, the hook being connected to the first arm and the vane being connected to the second arm.

3. A fishing lure as set forth in claim 2 wherein the first and second diverging arms are dislosed in generally coplanar relationship.

4. A fishing lure as set forth in claim 1 wherein the lure comprises means for maintaining the depth of the lure as it travels through the water.

5. A fishing lure as set forth in claim 1 wherein said vane is generally shaped in the likeness of a crayfish body.

6. A fishing lure as set forth in claim 1 wherein said vane is generally shaped in the likeness of a fish.

7. A fishing lure as set forth in claim 1 wherein said vane is hollow, having opposed convex sidewalls forming an inner cavity.

8. A fishing lure as set forth in claim 7 wherein said vane has a plurality of pellets in the cavity.

9. A fishing lure as set forth in claim 1 wherein said fastening means comprises a clevis.

10. A fishing lure as set forth in claim 1 wherein said attaching means comprises an eye with a rearward peripheral opening.

11. A fishing lure comprising first and second diverging arms, means adjacent the juncture of said arms for attaching the lure to a fishing line, a hook connected to the first arm, a vane connected to the second arm, the vane adapted for oscillating movement but not for full rotational movement relative to a fixed axis as the lure travels through the water, a spinner and means for rotatably fastening the spinner to vane.

12. A fishing lure as set forth in claim 1 wherein the lure comprises means for maintaining the depth of the lure as it travels through the water.

13. A fishing lure as set forth in claim 1 wherein said means for maintaining the depth of the lure comprises a lip.

14. A fishing lure as set forth in claim 1 wherein said fastening means comprises a clevis.

15. A fishing lure comprising a vane adapted for oscillating lateral movement but not adapted for full rotational movement, a spinner, means rotatably fastening the spinner to the vane, a hook, means connecting the hook to the vane, a lip adapted for maintaing the depth of the lure as it travels through the water and means for attaching the lure to the fishing line.

16. A fishing lure as set forth in claim 4 wherein said means for maintaining the depth of the lure comprises a lip.

* * * * *

UNITED STATES PATENT AND TRADEMARK OFFICE
CERTIFICATE OF CORRECTION

PATENT NO. : 4,765,085
DATED : August 23, 1988
INVENTOR(S) : Fred W. Wotawa and Patrick J. Wotawa It is certified that error appears in the above—identified patent and that said Letters Patent is hereby corrected as shown below:

Column 5, claim 1, line 36, "to means" should read --to the vane generally adjacent the rear of the vane, a hook, means--. Column 5, claim 1, lines 37-38, "at a the vane generally adjacent the rear of the vane, a hook, point forward" should read --at a point forward--. Column 6, claim 12, line 30, "set forth in claim 1" should read --set forth in claim 11--. Column 6, claim 13, line 33, "set forth in claim 1" should read --set forth in claim 12--. Column 6, claim 14, line 36, "set forth in claim 1" should read --set forth in claim 11--.

Signed and Sealed this

Thirty-first Day of January, 1989

Attest:

DONALD J. QUIGG

*Attesting Officer*       *Commissioner of Patents and Trademarks*